(12) United States Patent
Bleikolm et al.

(10) Patent No.: US 6,926,764 B2
(45) Date of Patent: Aug. 9, 2005

(54) INK SET, PRINTED ARTICLE, A METHOD OF PRINTING AND USE OF A COLORANT

(75) Inventors: Anton Bleikolm, Ecublens (CH);
Pierre DeGott, Crissier (CH);
Claude-Alain Despland, Lausanne (CH); Edgar Müller, Fribourg (CH)

(73) Assignee: SICPA Holding S.A., Prilly (CH)

(*) Notice: Subject to any disclaimer, the term of this patent is extended or adjusted under 35 U.S.C. 154(b) by 0 days.

(21) Appl. No.: 10/492,718

(22) PCT Filed: Aug. 30, 2002

(86) PCT No.: PCT/EP02/09666

§ 371 (c)(1),
(2), (4) Date: Apr. 14, 2004

(87) PCT Pub. No.: WO03/038001

PCT Pub. Date: May 8, 2003

(65) Prior Publication Data

US 2004/0253419 A1 Dec. 16, 2004

(30) Foreign Application Priority Data

Oct. 31, 2001 (EP) .............................................. 01125983

(51) Int. Cl.⁷ .............................................. C09D 11/02
(52) U.S. Cl. .................................. 106/31.27; 106/31.6
(58) Field of Search .............................. 106/31.27, 31.6

(56) References Cited

U.S. PATENT DOCUMENTS

| | | | |
|---|---|---|---|
| 4,606,859 A | | 8/1986 | Duggan et al. |
| 5,438,928 A | * | 8/1995 | Chatwin et al. ............. 101/369 |
| 6,211,265 B1 | | 4/2001 | Ohta et al. |
| 6,576,155 B1 | * | 6/2003 | Barbera-Guillem .... 252/301.36 |
| 6,786,954 B1 | * | 9/2004 | Lee et al. ................. 106/31.13 |
| 2003/0177941 A1 | * | 9/2003 | Barbera-Guillem ....... 106/31.15 |
| 2005/0031838 A1 | * | 2/2005 | Lagunowich et al. ..... 428/211.1 |

FOREIGN PATENT DOCUMENTS

| | | |
|---|---|---|
| EP | 0340898 | 11/1989 |
| EP | 0408191 | 1/1991 |
| EP | 0467067 | 1/1992 |
| EP | 0553614 | 8/1993 |
| WO | WO 90/16043 | 12/1990 |

* cited by examiner

*Primary Examiner*—J.A. Lorengo
*Assistant Examiner*—Veronica F. Faison
(74) *Attorney, Agent, or Firm*—Shoemaker and Mattare

(57) ABSTRACT

The invention relates to an ink set comprising a plurality of inks of a first and of a second group, having different colors. Inks of said first group comprise a visible colorant and an additional IR-absorbing compound (IR-taggant) which has an absorption peak at a predetermined wavelength in the near infrared. Inks of said second group comprise a visible colorant which has at the same time an infrared absorption peak at the same wavelength as that of the IR-taggant used in the inks of the first group. Preferred embodiment is a four-color process ink set comprising an IR feature.

22 Claims, 3 Drawing Sheets

INK SET, PRINTED ARTICLE, A METHOD OF PRINTING AND USE OF A COLORANT

Figure 1:
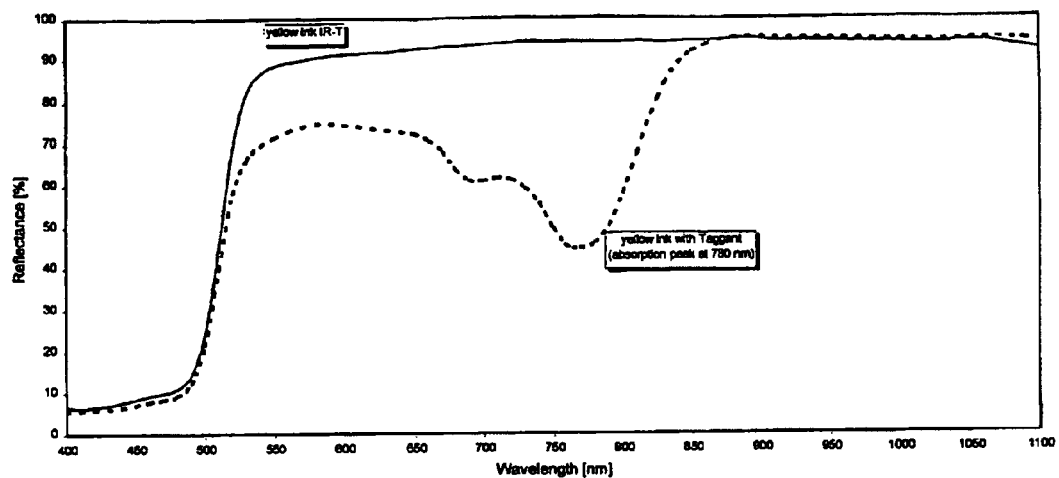

The invention relates to an ink set for printing indicia, to a printed article, to a method of printing said indicia onto an article, and to the use of a colorant or pigment in an ink of said ink set for printing said indicia.

Spectrally selective non-visible electromagnetic radiation absorbing inks, in particular near-infrared (NIR) absorbing inks, are widely known and used in the art. Infrared (IR) absorbing inks serve among others for the printing of machine readable markings such as text, numbers or barcodes, as well as for the printing of anti-counterfeit markings which help to authenticate articles carrying such inks. In particular, the growing field of brand-protection applications calls for covert markings, which can be applied through traditional offset or packaging printing.

EP 340898 B1 discloses a method of authentication, wherein a first identification mark comprising a colorless material having high absorption in the near infrared is applied to an article, and this mark is subsequently overprinted with a second identification mark comprising a colorant which does not have absorption in the near infrared. This method requires the printing of two different inks on top of each other.

EP 553614 discloses the use of a liquid comprising specific phthalocyanines as a printing ink. Said phthalocyanines are used as infrared absorbing components, having spectral absorption maxima in the wavelength range between 700 and 1200 nm. Phthalocyanines are generally known in the art as infrared absorbing coloring agents.

WO 90/1604 discloses an authenticating system for authenticating an article carrying a IR-taggant. Said IR-taggant is chosen such as to have a characteristic wavelength-selective light absorption spectrum. As an example of wavelength selective absorbing IR-taggants exhibiting narrow absorption characteristics, rare earth compounds are suggested.

Infrared (and UV) absorbing materials which are transparent in the visible region are further known from GB 2,168,372. EP 484018 discloses phthalocyanine compounds which are useful as infrared absorbers having an absorption wavelength maximum between 680 and 900 nm. Such compounds are used among other applications for the coating of optical data storage discs, as well as for security applications, e.g. as ingredients in inks for printing currency or cheques. EP 408191 concerns substituted phthalocyanines absorbing near infrared radiation in the wavelength range of 700 nm to 1500 nm, more particularly of 725 nm to 1100 nm. EP 134518 discloses naphthaloocyanine compounds which are superior near infrared absorbers in the spectral range of 750 nm to 900 nm, and which may be used as pigments or dyestuffs in coating compositions. EP 282182 relates to substituted phthalocyanines having an absorption band in the near infrared region between 700 nm and 1500 nm, and which are used to print markings for optical character recognition (OCR) systems. U.S. Pat. No. 46,068,509 discloses further near infrared absorbing phthalocyanine compounds which can be used in the above mentioned applications.

EP 552047 discloses printed matter carrying an infrared absorbing mark. Said printed matter comprises a substrate having an infrared absorbing mark in a predetermined configuration. Said mark comprises indicia having high light absorption in the infrared region and an infrared-transparent, colored concealing layer covering—hiding—the infrared absorbing indicia.

DE 3826734 discloses a machine readable ink absorbing light in the spectral wavelength range between 700 nm and 1000 nm. An IR-absorbing pigment is added to an ink comprising other, visible light absorbing pigments. EP 155780 discloses particular poly (substituted) phthalocyanines which absorb light in the near infrared region. DE 4022822 relates to a printed article comprising first information visible to the unaided eye and second information invisible to the eye. The first, visible information is made with colorants which transmit light in the invisible spectrum. The second information comprises colorants which are absorbing in the invisible spectrum.

All the above IR-absorbing inks—comprising IR-absorbing colorants or pigments—must be applied in a separate printing step (additional pass), exclusively used to print the infrared-absorbing marking onto the article in question. Said infrared-absorbing inks furthermore often exhibit their own body color in the visible range (400 nm to 700 nm) of the spectrum, in addition to a determined infrared absorption characteristics, which makes it difficult to integrate them into an artistic four-color design. For this reason, the markings realized with such inks are normally overprinted with an IR-transparent and strongly colored ink, which covers the body color of the IR-absorbing markings.

From the designer and printer's point of view, it would be highly desirable to have available a complete four-color set of printing inks exhibiting a same, determined infrared absorption feature, which can be used together with a conventional four-color set of printing inks not having said infrared absorption feature.

It was thus tried to make printing inks comprising dyes or pigments of a specific color, in combination with particular infrared absorbing components (IR-taggants). An ink set for the four-color printing process usually comprises the shades black, yellow, magenta and cyan. The inventors have found that certain infrared absorbing compounds, absorbing radiation in the spectral region around 780 nm, can be added to IR-transparent black, yellow and magenta inks without substantially changing the visible properties of said inks, while leading to a clearly detectable absorption peak in the near infrared spectral region. However, problems were encountered with the visibility of the near-infrared absorption peak in the case of green or blue inks. Green and blue inks are generally based on phthalocyanine colorants such as C.I. Pigment Green 7, or C.I. Pigment Blue 15:3.

Phtalocyanines are noteworthy absorbing visible light up to wavelengths of 750 nm and more. The IR-marker's absorption peak in the range of 700 nm to 900 nm can no longer be clearly detected in the presence of such a pigment. The reliability of the resulting authentication mark is therefore reduced.

It is an object of the present invention to overcome the drawbacks of the prior art, and in particular to provide an IR-absorbing four-color ink set, a printed article, a method of printing, and a colorant which allow to print security indicia in multicolor printing which have allow a reliable authentication irrespective of the color of the indicia.

This object is solved with an ink set, an ink, a printed article and a method of printing according to the features of the independent patent claims.

The ink set for printing light absorbing indicia according to the present invention comprises at least two inks having different colors. The ink set therefore allows to print multicolor indicia. Each of the inks of said ink set includes at least one visible colorant or pigment. The ink set comprises a first group of inks and a second group of inks. The inks of the first group comprise a visible colorant (pigment or dye)

and an additional taggant such as an IR-absorbing compound (IR-taggant), having predetermined detectable spectral characteristics, preferably absorption characteristics, e.g. an absorption peak at a predetermined wavelength in the near infrared (NIR) spectral range. A spectral characteristic means the wave length dependent optical characteristic of the taggant such as, but not limited to, the absorption. The inks of the second group comprise a colorant (pigment or dye) which absorbs light in the visible range of the spectrum (therefore providing visible color) whilst at the same time at least partially exhibiting substantially the same predetermined spectral characteristics as said taggant used in the first group of inks. At least partially in this context means at least in a predetermined wavelength range. The same spectral characteristics is especially a qualitatively same spectral absorption curve in the NIR range (above 700 nm). Qualitatively same spectral absorption curves in the context of the present invention means that in a predetermined range of wavelengths the spectral absorption curves under comparison show absorption maxima (peaks) and/or absorption minima and/or absorption edges at substantially the same wavelengths. Substantially the same wavelengths according to the present invention are typically wavelengths which lay not more than 10 nm from each other.

Other predetermined spectral characteristics such as e.g. the width of an absorption peak, the hight to width relationship of a peak where changes of the curvature of the spectrum are conceivable as detectable characteristics. In the context of this invention, a spectral characteristic of a colorant is in any event similar to the spectral characteristic of a taggant when presence/absence of both, the colorant and the taggant can be detected with the same detection means or system.

In particular, a four-color set of inks having determined infrared absorption characteristics can be provided by mixing the IR-absorbing taggant into IR-transparent black, yellow and magenta inks to yield the inks of said first group, and by choosing an appropriate colorant (pigment or dye) for the cyan ink, as the ink of said second group, whereby said colorant must exhibit simultaneously the required blue color shade in the visible spectrum and the required IR-absorption characteristics of the IR-taggant.

IR-transparent black ink is noteworthy based on a pigment absorbing over the entire visible part of the spectrum (400–700 nm wavelength), without showing significant absorption at wavelengths in the range of 700–2500 nm. IR-transparent black ink can be realized e.g. based on C.I. Pigment Black 31 or C.I. Pigment Black 32.

In the following, absorption characteristics shall mean relative spectral characteristics as a function of wavelength. The invention is, however, not limited to the concept of absorption; diffuse spectral reflection or spectral transmission being equally well suited to assess the spectral characteristics of a pigment or an ink.

Similar spectral characteristics in practice e.g. means that the resulting inks exhibit a discernable near-infrared absorption peak, or other spectral feature, at substantially the same wavelength as the peak, or feature, of the IR-taggant, such that the inks of said first and those of said second group can be detected (authenticated) using the same infrared-absorption detecting equipment. Typically, such detecting equipment assesses the relative diffuse reflection intensities at three or more different wavelengths in the NIR spectral range, assessing herewith the position of the infrared absorption peak.

Particular importance is given to the chemical resistance and lightfastness of the dyes or pigments to be used in the context of the present invention. Pigments used for the printing of security documents or currency should have a lightfastness of 3 or more on the IWS (International Wool Scale). Said pigments should furthermore resist to the harsh environments in ink formulations and on print, in particular to the different types of chemistries used to dry the ink, such as heat-set, catalytic oxypolymerization, UV-initiated cationic or radical cross-linking, etc. Said pigments should finally resist to various organic solvents, to acids and alkali, as well as to industrial laundry, too.

The ink set according to the present invention allows thus the printing of multicolored indicia with covert IR-absorption characteristics onto a security document—banknote, document of identity or of value, etc.—or onto an article. The ink set can noteworthy be combined with a second ink set of same colors, but not exhibiting said IR-absorption characteristics. This allows for the printing of hidden IR-absorbing information within a multicolored image or text part. Of particular interest in this context is a conjugated hyper-set of two four-color process printing ink sets yellow, magenta, cyan and black; a first set containing the IR-absorbing feature, and a second set not containing it. Four-color process printing using the base inks yellow, magenta, cyan and black can noteworthy be used to represent a large part of the shades which are perceptible by the human eye.

According to a preferred embodiment of the invention, the ink set comprises four inks having the shades required for conventional four color process printing, i.e. black, yellow, magenta and cyan. Said first group of inks preferably includes the black, yellow and magenta inks. Said second group includes the cyan ink. It was found that there are suitable cyan-shade pigments which have at the same time an appropriate near-infrared absorption peak. Preferably, the pigments of the second group of inks are chosen among the metal-free unsubstituted or substituted phthalocyanines of the crystallographic X-form.

The X-form of metal-free phthalocyanine has first been disclosed in U.S. Pat. No. 3,357,989 and by Sharp and London, J. Phys. Chem, 1968, 72 (9), pages 3230–3235. It exhibits a particular X-ray diffraction pattern, and has photoconductive properties, useful for electrophotography. The X-form can be obtained from the less stable, but more common alpha- or beta-modifications by recrystallization in acid or organic solvents, or by heat treatment at elevated temperatures, as e.g. described in U.S. Pat. Nos. 3,594,163; 3,657,272; 3,932,180; 4,098,795; 4,814,441; JP 7,301,932 A2; EP 269,079 B1.

The term "X-form" has been used to characterize said particular, most stable crystal modification of unsubstituted metal-free phthalocyanine of the formula:

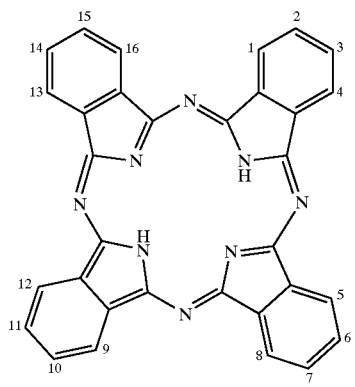

In the context of the present invention, the term "X-form" shall also be understood in a larger sense, including the corresponding crystal modifications of peripherally substituted metal-free phthalocyanines as well. From 1 to 16 of the peripheral hydrogen atoms in the four benzene rings of the phthalocyanine molecule may noteworthy be replaced by halogen atoms and by numerous organic and inorganic groups.

There are also metal-containing phthalocyanine pigments, which show a second absorption peak in the near infrared spectral range, such as certain modifications of copper-phthalocyanine (absorption peak at 730 nm) and of titanium-phthalocyanine (absorption peak at 850 nm). Said metal-containing phthalocyanine compounds can in consequence be used as well in the context of the present invention, given that a suitable IR-taggant is available to provide the remaining inks with the same spectral absorption characteristics in the near-infrared.

The IR-taggant is preferably a compound absorbing light in a wavelength range of 700 to 900 nm, without exhibiting substantial absorption throughout the visible range (400 to 700 nm), in order to avoid interference with the visible color of the inks. It preferably exhibits an absorption peak at about 780 nm. The IR-taggant is preferably selected from the group of benzenethiol-substituted copper-phthalocyanines. Said substituted phthalocyanines are obtained in a general way by a chlorination of copper-phthalocyanine, followed by reacting the chlorinated product with unsubstituted or substituted benzenethiols. Between 12 and 16 of the available positions in the phthalocyanine molecule are substituted in this way. The preferred IR-taggant in the context of the present invention is para-toluenethiol-persubstituted copper-phthalocyanine of the formula:

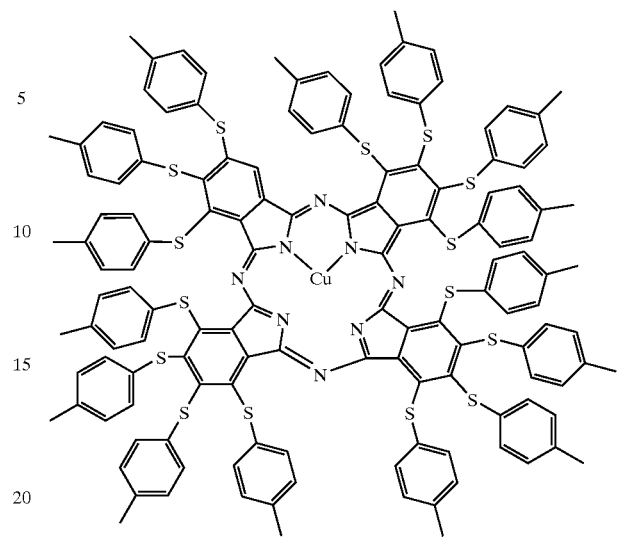

According to another aspect of the invention, a printed article is proposed, comprising indicia which absorb light at a predetermined wavelength in the near infrared. The indicia are printed with an ink set as defined above.

According to still another aspect of the invention, a method of printing indicia, absorbing light in a predetermined wavelength in the near infrared range of the spectrum, is proposed. Said method comprises the steps of applying at least one ink of said first group of inks and applying at least one ink of said second group of inks of an ink set as defined above.

The invention further proposes the use of an IR-colorant (pigment or dye) in an ink which is part of an ink set for multi-color printing. Said IR-colorant absorbs light in the near-infrared part of the spectrum according to a particular absorption characteristics and has simultaneously a specific visible absorption (color) as a colorant. The ink set includes at least one ink comprising said IR-colorant or pigment. The ink set further includes at least one ink comprising a visible colorant of a different color and an additional IR-taggant absorbing light in the near-infrared part of the spectrum, exhibiting a similar infrared absorption characteristic to that of the IR-colorant. Preferably, the invention relates to the use of a metal-free phthalocyanine of the crystallographic X-form, exhibiting an infrared absorption peak at 780 nm, as the IR-colorant or pigment of an ink of an ink set, in combination with other inks containing a visible-shade conferring pigment and an IR-taggant absorbing light in the wavelength range of 700 to 900 nm, preferably having an absorption peak at 780 nm, which substantially matches the absorption peak of said IR-colorant or pigment. In the present invention, substantially match means, that the spectral absorption curves show absorption maxima (peaks) and/or absorption minima and/or absorption edges at wavelengths which are not more than 10 nm from each other when the absorption curves are compared with each other.

Within the context of the present invention various alternative embodiments can be provided.

It is noteworthy possible to provide and use ink sets comprising less than four or more than four colors. While it is preferred to select blue or green inks having inherent IR-absorption characteristics similar to the IR-absorption characteristics of the IR-taggant, other colorants having such properties can be found and used. It is also possible to use pigments comprising rare-earth elements as infrared-absorbing taggants; such pigments are known to those skilled in the art. Said pigments may noteworthy have additional properties, such as up- or down-converting luminescence, which are useful as supplementary security features. While IR-taggants and IR-colorants absorbing light in the near infrared range of the spectrum are a preferred embodiment of the present invention, the latter is not limited to near-infrared absorbers. It is also possible to use taggants and colorants absorbing in other wavelength ranges outside the visible spectrum, such as in the far infrared or in the ultraviolet range.

The printed article may be e.g. a package for valuable products which are sensitive to counterfeiting, such as packages for perfumes, cigarettes, computer software or the like. The printed article may also be a label which can be attached to any kind of package or article. The printed article may further be a value document such as currency, stock certificates, tickets or the like, or an identity or rights-conferring document, such as a passport, an ID-card, a driving license, etc.

Inks according to the present invention may be applied to a substrate using any type of the known printing processes, such as intaglio, letterpress, screen-, and offset printing, as well as gravure and flexographic printing, ink-jet printing and printing methods using electrostatic or electrophoretic toners.

Figure 2:
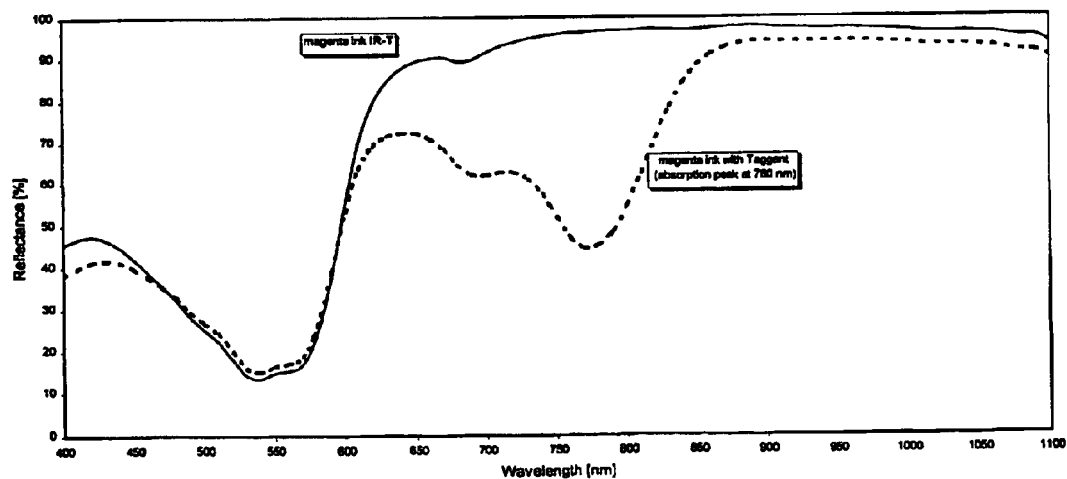
Figure 3:
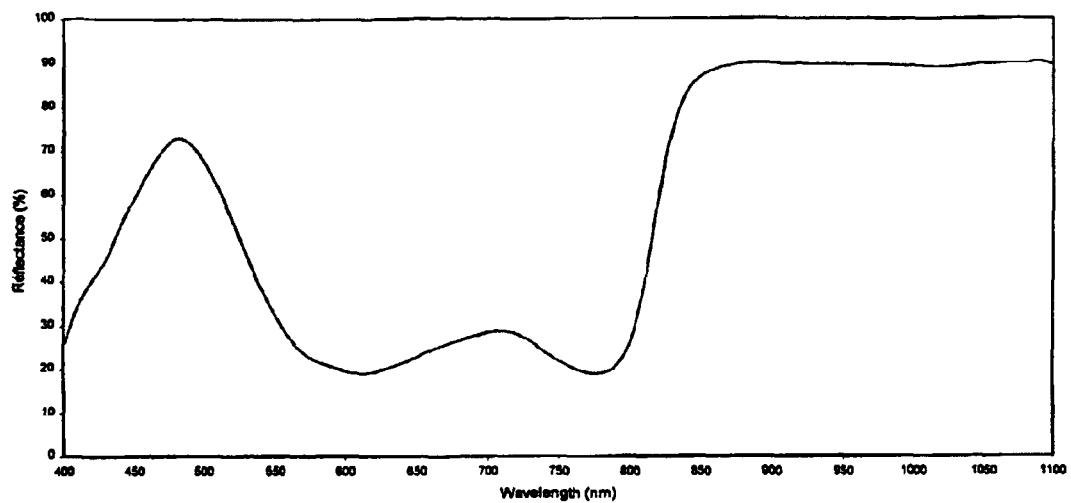
Figure 4:
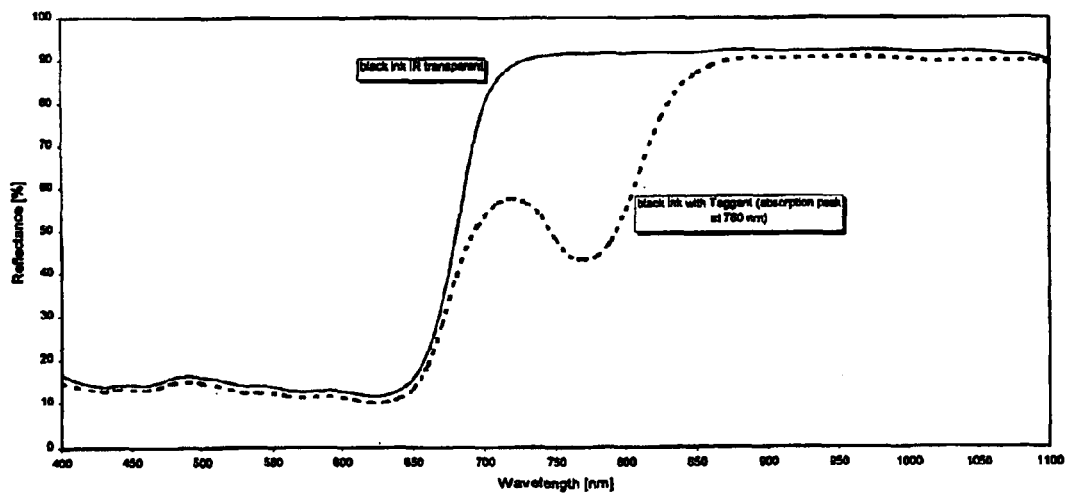
Figure 5:
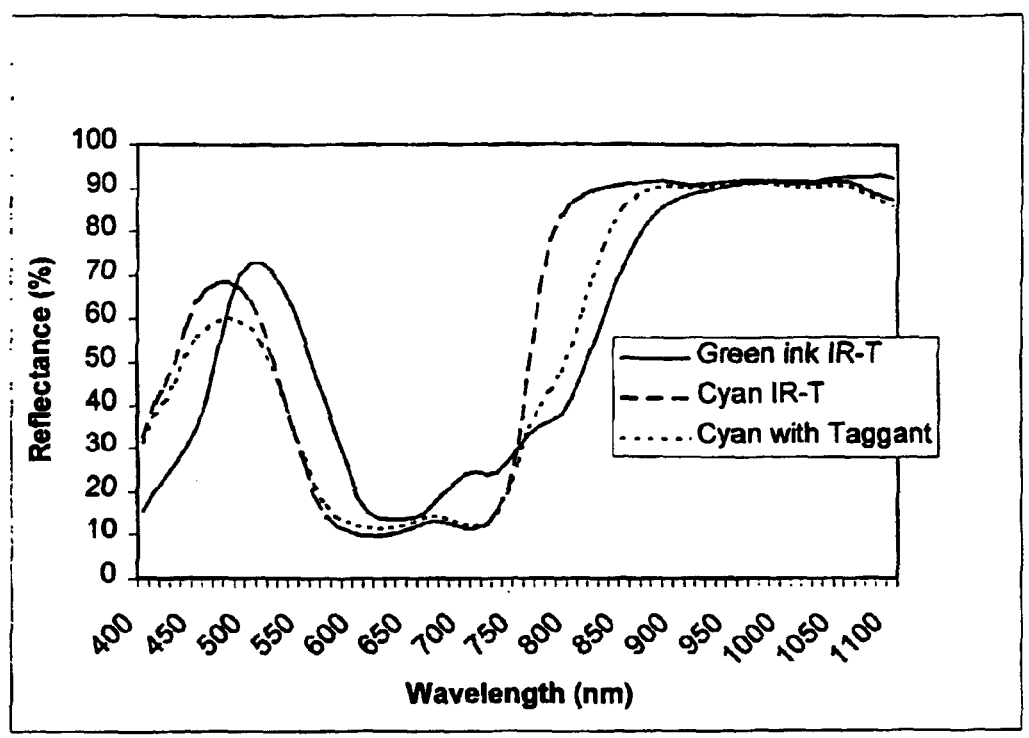

The invention will now be described in more detail by way of examples only, with reference to the figures which show:

FIG. 1 absorption spectra of a yellow ink with and without a near-infrared absorbing taggant, FIG. 2 absorption spectra of a magenta ink with and without a near-infrared absorbing taggant, FIG. 3 absorption spectrum of a visible & infrared absorbing ink without a taggant, FIG. 4 absorption spectra of a black ink with and without a near-infrared absorbing taggant, FIG. 5 comparison of spectra of green ink and cyan ink without a taggant, and cyan ink with a taggant.

FIG. 5 shows the absorption spectra of conventional cyan and green inks which may not be used in context of the present invention. The cyan ink based on C.I. Pigment Blue 15:3 without an IR-taggant (cyan IRT) has a substantial absorption in the range between 550 nm and 750 nm. If an IR-absorbing taggant is admixed to the same cyan ink, the absorption behavior is almost unchanged in the range of 500 to 750 nm. There is a small difference in absorption in the range between 750 and 900 nm, however, there is no absorption peak in this range which could be easily detected. Substantially the same observations hold for the green ink based on C.I. Pigment Green 7. As there is no detectable near-infrared absorption peak neither in the case of the green nor in that of the cyan ink, as shown in FIG. 5, it is not possible to use these inks within a same security system in combination with the infrared-tagged yellow, magenta and black inks, which all show a discernable absorption peak in this wavelength area.

FIGS. 1, 2 and 4 show the absorption spectra of yellow, magenta and black inks, once with and once without a near-infrared absorbing taggant. FIG. 3 shows the absorption spectrum of an infrared-absorbing cyan ink according to the present invention, i.e. based on an IR-colorant (IR-pigment) which exhibits a similar near-infrared absorption to that of the near-infrared absorbing taggant. The inks of which the absorption spectra are shown in FIGS. 1 to 4 form together an ink set for four-color printing. These four base inks can be used in standard four-color process printing to represent a large number of the shades which are perceptible by the human eye. All colors obtained in such a way will show the near-infrared absorption peak at 780 nm as a covert security feature. The so obtained ink set can be combined in juxtaposition with ordinary four-color process inks, i.e. inks not exhibit said covert NIR absorption, to realize covert NIR markings within a printed area.

In the following, a number of exemplary ink formulations for different printing applications are disclosed. The inks obtained in this way can be combined with ink-sets, as outlined in the examples below.

To obtain the following intaglio, lithographic or letter-press inks, the indicated components are mixed together and homogenized on a 3-roll mill, using two passages at 30 bar.

| Intaglio printing ink cyan: | |
|---|---|
| Addition product of tung oil and maleic acid modified phenolic resin in a high boiling mineral oil (PKWF 28/31) | 35.0% |
| Long oil alkyd resin | 7.5% |
| Alkylphenolic resin modified with raw tung oil in ink solvent 27/29 (Shell Ind. Chemicals) | 16.0% |
| Polyethylene wax | 1.5% |
| Calcium carbonate | 32.8% |
| X-form phtalocyanine pigmet, e.g. unsubstituted metal-free dihydrogeno-phthalocyanine (Pc-H2) in the crystallographic X-form | 2.0% |
| Ink solvent 27/29 (Shell Industrial Chemicals) | 5.0% |
| Cobalt octoate (10% metal) | 0.1% |
| Manganese octoate (10% metal) | 0.1% |
| Lithographic printing ink cyan: | |
| Phenolic resin modified resin cooked with lineseed oil | 33.0% |
| Long oil alkyd resin | 42.2% |
| Polyethylene wax | 2.0% |
| Ink solvent 27/29 (Shell Industrial Chemicals) | 2.0% |
| Cooked lineseed oil | 5.0% |
| X-form phthalocyanine pigment, e.g. unsubstituted metal-free dihydrogeno-phthalocyanine (Pc-H2) in the crystallographic X-form | 10.0% |
| Titanium dioxide | 5.0% |
| Cobalt octoate (10% metal) | 0.8% |
| Lithographic printing ink yellow: | |
| Phenolic resin modified resin cooked with lineseed oil | 31.5% |
| Long oil alkyd resin | 38.7% |
| Polyethylene wax | 2.0% |
| Ink solvent 27/29 (Shell Industrial Chemicals) | 2.0% |
| Cooked lineseed oil | 5.0% |
| C.I. Pigment Yellow 13 | 15.0% |
| IR-taggant | 3.0% |
| Titanium dioxide | 2.0% |
| Cobalt octoate (10% metal) | 0.8% |
| Lithographic printing ink magenta: | |
| Phenolic resin modified resin cooked with lineseed oil | 31.5% |

| -continued | |
|---|---|
| Long oil alkyd resin | 38.7% |
| Polyethylene wax | 2.0% |
| Ink solvent 27/29 (Shell Industrial Chemicals) | 2.0% |
| Cooked lineseed oil | 5.0% |
| C.I. Pigment Red 122 | 15.0% |
| IR-taggant | 3.0% |
| Titanium dioxide | 2.0% |
| Cobalt octoate (10% metal) | 0.8% |
| Lithographic printing ink black: | |
| Phenolic resin modified resin cooked with lineseed oil | 30.0% |
| Long oil alkyd resin | 36.0% |
| Polyethylene wax | 2.0% |
| Ink solvent 27/29 (Shell Industrial Chemicals) | 2.0% |
| Cooked lineseed oil | 5.0% |
| C.I. Pigment Black 31 | 18.0% |
| C.I. Pigment Violet 23 | 1.2% |
| IR-taggant | 3.0% |
| Titanium dioxide | 2.0% |
| Cobalt octoate (10% metal) | 0.8% |
| Letterpress printing ink: | |
| Phenolic resin modified resin cooked with lineseed oil | 29.5% |
| Long oil alkyd resin | 38.7% |
| Polyethylene wax | 2.0% |
| Ink solvent 27/29 (Shell Industrial Chemicals) | 2.0% |
| Cooked lineseed oil | 5.0% |
| Pigment content | 10.0% |
| Titanium dioxide | 6.0% |
| Silicon dioxide (Aerosil 200, Degussa-Huels AG) | 6.0% |
| Cobalt octoate (10% metal) | 0.8% |

To obtain the following gravure printing inks, the components are first homogenized together by bead milling, and the resulting ink concentrate is diluted with the indicated quantities of solvent. Finally, the viscosity is adjusted to 18" DIN4 with 2:1 Ethyl-acetate/Ethanol mixture; preferably immediately before printing.

| Gravure printing ink cyan: | |
|---|---|
| Ethanol | 20.0% |
| Ethyl acetate | 19.5% |
| Dicyclohexylphtalate (Unimoll 66, Bayer) | 4.0% |
| Fumaric acid modified rosin (Rokramar 7200, supplied by Robert Kraemer GmbH & Co) | 4.0% |
| Polyvinylbutyral resin (Pioloform BN18, supplied by Wacker-Chemie) | 9.5% |
| X-form phthalocyanine pigment, e.g. unsubstituted metal-free dihydrogeno-phthalocyanine (Pc-H2) in the crystallographic X-form | 5.0% |
| *** bead milling | |
| Ethanol | 12.0% |
| Ethyl acetate | 26.0% |
| Gravure printing ink yellow: | |
| Ethanol | 20.0% |
| Ethyl acetate | 19.0% |
| Dicyclohexylphtalate (Unimoll 66, Bayer) | 4.0% |
| Fumaric acid modified rosin (Rokramar 7200, supplied by Robert Kraemer GmbH & Co) | 4.0% |
| Polyvinylbutyral resin (Pioloform BN18, supplied by Wacker-Chemie) | 9.0% |
| C.I. Pigment Yellow 13 | 7.0% |
| IR-taggant | 1.0% |
| *** bead milling | |
| Ethanol | 12.0% |
| Ethyl acetate | 26.0% |
| Gravure printing ink black: | |
| Ethanol | 19.5% |
| Ethyl acetate | 19.0% |

| -continued | |
|---|---|
| Dicyclohexylphtalate (Unimoll 66, Bayer) | 4.0% |
| Fumaric acid modified rosin (Rokramar 7200, supplied by Robert Kraemer GmbH & Co) | 4.0% |
| Polyvinylbutyral resin (Pioloform BN18, supplied by Wacker-Chemie) | 9.0% |
| C.I. Pigment Black 31 | 8.0% |
| C.I. Pigment Violet 23 | 0.5% |
| IR-taggant | 1.0% |
| *** bead milling | |
| Ethanol | 12.0% |
| Ethyl acetate | 26.0% |

*** viscosity adjusted to 18" DIN4 with 2:1 EtAc/EtOH

The IR-taggant in all relevant cases is a pigment chosen of the class of the benzenethiol-substituted copper-phthalocyanines mentioned above.

The inks of which the absorption spectra are shown in FIGS. 1 to 4 form a first example of an ink set according to the present invention:

EXAMPLE 1

The first example of an ink set is composed of four lithographic printing inks (black, magenta, yellow and cyan), prepared according to the formulas given above:

Yellow Ink:

The absorption spectra of the yellow ink are shown in FIG. 1. The yellow ink without IR-taggant (continuous line) has an absorption edge at about 500 nm and has a negligible absorption between 520 and 1100 nm (continuous line). The yellow ink with admixed IR-taggant has an additional absorption peak at 780 nm which is due to the IR-taggant (dashed line). The peak at 780 nm can be easily detected with an appropriate detection system.

Magenta Ink:

FIG. 2 shows the absorption spectrum of a magenta ink without IR-taggant and of the magenta ink of an ink set according to the invention. The magenta ink without IR-taggant (continuous line) shows an absorption peak of the C.I. Pigment Red 122 at about 530 nm. The ink has a negligible absorption between 650 and 1100 nm. The magenta ink with admixed IR-taggant (dashed line) has an additional absorption peak at 780 nm which is due to the IR-taggant.

Cyan Ink:

FIG. 3 shows the absorption spectrum of the cyan ink. The cyan ink has an absorption peak at about 600 nm which leads to the visible, cyan color of the ink. The pigment of the cyan ink is selected in such a way that it has an additional absorption peak at 780 nm. The absorption peak at 780 nm has a form which is similar to the form of the absorption peak of the IR-taggant contained in the yellow or in the magenta ink (see FIGS. 1 and 2) or in the black ink (see FIG. 4). It is not necessary to use a IR-taggant in the cyan ink because the pigment of the cyan ink assumes both, the functions of visible absorption (color) and of near-infrared absorption (IR-taggant).

Black Ink:

The absorption spectrum of the NIR-transparent black ink of the first example of an ink set is shown in FIG. 4. The continuous line shows the spectrum of the ink without an added IR-taggant. The ink has a substantially continuous and strong absorption between 400 and 670 nm and a negligible absorption between 700 and 1100 nm. If the IR-taggant is admixed, the black ink exhibits an additional absorption peak at 780 nm (dashed line).

The ink set comprising the inks as shown in FIGS. 1 to 4 allows to print indicia of any color by the standard four-color process. All so obtained colors exhibit a clearly detectable absorption peak at 780 nm.

The IR-taggant is selected in such a way that it does not have a negative impact on the shades of the yellow, magenta and black inks, i.e. the IR-taggant must not have substantial absorption in the visible range of the spectrum.

EXAMPLE 2

The second example of an ink set according to the invention is composed of three gravure inks (black, yellow and cyan), prepared according to the formulas given above. The so obtained ink set may be used to print packages exhibiting covert, IR-absorbing markings, useful for brand-protection purposes.

The present invention discloses thus an ink set comprising inks of a second group, based on a visible-and-infrared absorbing pigment selected in such a way that it has substantially the same near-infrared absorption characteristics as inks of a first group, which are based on infrared-transparent pigments and a separately admixed near-infrared absorbing taggant.

The IR-absorbing feature of the inks according to the present invention can be detected, and thus verified, in a number of different ways. A first detection method includes the measurement of the printed sample's diffuse reflectance spectrum. The so obtained spectral reflectance curve is analyzed for an IR-absorption peak centered at the predefined respective wavelength (780 nm in the preferred option described above). The result of this analysis, i.e. the presence or absence of said peak, is used as the authenticity criterion for the printed sample. This method needs a spectrometer-based hardware and the corresponding processing means in order to perform the test.

A second, simplified method is based on a small incandescent light source and 4 photodetector channels, comprised in a hand-held instrument. Each of said photodetector channels comprises an optical band-pass filter, a silicon photodiode and a transimpedance amplifier. The outputs of the four amplifiers are connected to a programmable microcontroller circuit, which controls as well the light source. The optical band-pass filters have windows at 730±10 nm, 780±10 nm, 830±10 nm, and 980±10 nm; the first figure indicating the center wavelength and the second figure half of the width of the band-pass. The microcontroller circuit is programmed to read the four intensity values furnished by the four photodetector chains, and to calculate the three intensity ratios R1=I(730)/I(980); R2=I(780)/I(980); and R3=I(830)/I(980). The reflected intensity at 980 nm, I(980), is hereby used as a reference signal, to yield the measurement values R1, R2, and R3 independent of the illumination intensity. To detect an IR-absorption peak at 780 nm, R2 must have a value at a determined level below the values of R1 and R3. The microcontroller is further programmed to perform such testing, and to furnish a yes/no authentication signal as the result of the testing operation.

A third, still further simplified method, makes use of a single photodetector chain without optical filter, together with four light-emitting diodes, emitting at four different wavelengths. The photodetector chain comprises a silicon photodiode and a transimpedance amplifier, whose output is connected to a programmable microcontroller circuit. The microcontroller circuit controls as well the four light-emitting diodes, which are chosen to emit at center wavelengths of 740 nm, 770 nm, 810 nm, and 950 nm. The emission of a light-emitting diode has a spectral half-width of the order of 40 nm, such that the diodes can be used to illuminate successive parts of the sample's absorption characteristics. For testing a printed sample, the microcontroller circuit is programmed to illuminate the sample sequentially with the four light sources at the four wavelengths, and to record the intensity of the corresponding diffuse reflection signal, as supplied by the photodetector chain. Again, the ratios R1=I(740)/I(950), R2=I(770)/I(950), and R3=I(810)/I(950) are calculated (the reflection intensity at 950 nm serving as the reference), and the presence of an absorption peak at 780 nm is detected by comparing R2 with both, R1 and R3.

What is claimed is:

1. An ink set for printing light absorbing indicia comprising at least two inks,
    each of said inks having at least one colorant, pigment or dye absorbing visible light,
    wherein the ink set has a first group of inks and a second group of inks,
    the inks of said first group including an additional taggant with a predetermined detectable wavelength dependent optical characteristic, and
    the inks of said second group having a colorant, dye or pigment with a detectable wavelength dependent optical characteristic which is at least partially similar to the detectable wavelength dependent optical characteristic of said taggant.

2. An ink set according to claim 1, wherein said predetermined detectable wavelength dependent optical characteristic of said additional taggant is an absorption characteristic.

3. An ink set according to claim 1, wherein said detectable wavelength dependent optical characteristic of said colorant, dye or pigment in the inks of said second group is an absorption characteristic at least partially similar to the detectable wavelength dependent optical characteristic of said taggant.

4. An ink set according to claim 1, wherein the colorant, dye or pigment of the inks of the second group have a NIR absorption peak, at a wavelength substantially identical to the wavelength of a NIR absorption peak of the taggant of the inks of the first group.

5. An ink set according to claim 1, wherein the ink set consists of a black, a yellow, a magenta and a cyan ink.

6. An ink set according to claim 1, wherein the first group of inks includes black, yellow and magenta inks and wherein the second group of inks includes cyan or green inks.

7. An ink set according to claim 1, wherein the colorant of the ink of the second group is a phthalocyanine.

8. An ink set according to claim 7, wherein said phthalocyanine is a metal free unsubstituted dihydrogeno phthalocyanine of the crystallographic X-form.

9. An ink set according to claim 1, wherein the taggant has an absorption peak in the wavelength range of 700 nm to 900 nm.

10. An ink set according to claim 9, wherein said absorption peak is at a wavelength of 780 nm.

11. An ink set according to claim 9, wherein the colorant of the second group of inks has an absorption peak in the wavelength range between 700 nm and 900 nm.

12. An ink set according to claim 11, wherein said absorption peak is at a wavelength of 780 nm.

13. An ink set according to claim 1, wherein the taggant is a benzenethiol-substituted copper phthalocyanine.

14. An ink set according to claim 1, wherein the taggant has substantially no absorption in the visible spectrum.

15. An ink set according to claim 1, wherein said taggant has a light fastness of at least 3 on the international wool scale.

16. An ink set according to claim 1, wherein said colorant, dye or pigment has a light fastness of at least 3 on the international wool scale.

17. A printed article carrying a light-absorbing indicia, the indicia being printed with an ink set comprising at least two inks, each of said inks having at least one colorant, dye or pigment, wherein the ink set has a first group of inks and a second group of inks, the inks of said first group including an additional taggant with a predetermined detectable wavelength dependent optical characteristic, and the inks of said second group having a colorant, dye or pigment with a detectable wavelength dependent optical characteristic at least partially similar to the detectable wavelength dependent optical characteristic of said taggant.

18. A printed article according to claim 17, wherein said ink set is an ink set comprising at least two inks, each of said inks having at least one colorant, dye or pigment, wherein the ink set has a first group of inks and a second group of inks, the inks of said first group including an additional taggant with a predetermined detectable wavelength dependent optical characteristic, and the inks of said second group having a colorant, dye or pigment with a detectable wavelength dependent optical characteristic at least partially similar to the detectable wavelength dependent optical characteristic of said taggant.

19. A printed article according to claim 17, wherein said detectable wavelength dependent optical characteristic of said additional taggant is an absorption characteristic.

20. A method of printing an indicia having a detectable wavelength dependent optical characteristic onto an article, the method comprising the steps of applying at least one ink having a predetermined colorant of a first group of inks and applying at least one ink of a second group of inks having a different color than the inks of the first group wherein the inks of said first group include an additional taggant with a detectable wavelength dependent optical characteristic and wherein the inks of the second group have a colorant with a detectable wavelength dependent optical characteristic at least partially similar to the detectable wavelength dependent optical characteristic of said taggant.

21. The method according to claim 20, wherein said method is carried out with an ink set comprising at least two inks, each of said inks having at least one colorant, dye or pigment, wherein the ink set has a first group of inks and a second group of inks, the inks of said first group including an additional taggant with a predetermined detectable wavelength dependent optical characteristic, and the inks of said second group having a colorant, dye or a pigment with a detectable wavelength dependent optical characteristic which is at least partially similar to the detectable wavelength dependent optical characteristic of said taggant.

22. A dual ink set comprising a conventional four-colors ink set and an ink set according to claim 1.

* * * * *